United States Patent
Miyata

(10) Patent No.: US 9,659,580 B2
(45) Date of Patent: May 23, 2017

(54) MOVING-MAGNET TYPE PICKUP CARTRIDGE

(71) Applicant: KABUSHIKI KAISHA AUDIO-TECHNICA, Machida-shi, Tokyo (JP)

(72) Inventor: Mitsuo Miyata, Machida (JP)

(73) Assignee: KABUSHIKI KAISHA AUDIO-TECHNICA, Machida-Shi, Tokyo (JP)

( * ) Notice: Subject to any disclaimer, the term of this patent is extended or adjusted under 35 U.S.C. 154(b) by 0 days.

(21) Appl. No.: 15/096,912

(22) Filed: Apr. 12, 2016

(65) Prior Publication Data
US 2016/0314806 A1    Oct. 27, 2016

(30) Foreign Application Priority Data

Apr. 21, 2015    (JP) .................................. 2015-086465

(51) Int. Cl.
*G11B 3/00* (2006.01)
*G11B 3/10* (2006.01)
*H04R 11/12* (2006.01)

(52) U.S. Cl.
CPC ................ *G11B 3/10* (2013.01); *H04R 11/12* (2013.01)

(58) Field of Classification Search
CPC .............. G11B 3/00; G11B 3/10; H04R 11/12
USPC ....... 369/136, 170, 147, 146, 149, 172, 171, 369/134, 148
See application file for complete search history.

(56) References Cited

U.S. PATENT DOCUMENTS

| 5,062,095 A * | 10/1991 | Horikawa | ............ G11B 7/0925 |
| | | | 359/822 |
| 2009/0071441 A1* | 3/2009 | Kiessling | ................ F02P 9/005 |
| | | | 123/406.53 |
| 2015/0141088 A1* | 5/2015 | Hosoi | ................... H04M 1/035 |
| | | | 455/575.1 |

FOREIGN PATENT DOCUMENTS

| EP | 0555497 A1 | 8/1993 |
| GB | 884335 A | 12/1961 |
| JP | S61-31679 B2 | 7/1986 |
| JP | S61-47040 B2 | 10/1986 |

OTHER PUBLICATIONS

Europe Patent Office, "Search Report for European Patent Application No. 16165844.8," Jul. 13, 2016.

* cited by examiner

*Primary Examiner* — Allen T Cao
(74) *Attorney, Agent, or Firm* — Manabu Kanesaka

(57) ABSTRACT

A moving-magnet type pickup cartridge is disclosed, which includes a cantilever, a stylus chip attached to a front end part in a longitudinal direction of the cantilever, a damper disposed at a base end part in the longitudinal direction of the cantilever and configured to support the cantilever in a swingable manner, a magnet disposed in the longitudinal direction of the cantilever and immediately above the stylus chip at the front end part of the cantilever, and configured to vibrate with vibration of the stylus chip, and a yoke formed in a U-shape, having generating coils being wound thereon, and having magnetic poles at both leg parts thereof being disposed to face the magnet. With this configuration, there is provided a moving-magnet type pickup cartridge enables not only to ensure a large output signal but also to obtain a faithfully reproduced sound with little distortion.

6 Claims, 3 Drawing Sheets

MOVING-MAGNET TYPE PICKUP CARTRIDGE

RELATED APPLICATIONS

The present application is based on, and claims priority from, Japanese Application No. JP2015-086465 filed Apr. 21, 2015, the disclosure of which is hereby incorporated by reference herein in its entirety.

BACKGROUND OF THE INVENTION

Field of the Invention

The invention relates to a moving-magnet type pickup cartridge that extracts a signal from amplitude of a sound track engraved on a phonograph record, particularly to a pickup cartridge capable of obtaining a faithfully reproduced sound with little distortion as well as ensuring a large output signal.

Description of the Related Art

As disclosed in JP 61-31679 B for example, a moving-magnet type pickup cartridge employs a configuration in which a magnet is provided in the vicinity of a supporting point of a cantilever having a stylus chip at its tip end.

The magnet is disposed to face both leg parts (magnetic poles) of a yoke having generating coils being wound thereon.

When the stylus chip disposed at the tip end of the cantilever follows a sound groove of a phonograph record, the magnet provided in the vicinity of the supporting point of the cantilever vibrates through the cantilever. This configuration enables to change magnetic flux density applied to the both leg parts (magnetic poles) of the yoke, thereby acting on the generating coil to obtain an electrical signal as a sound reproduction signal.

JP 61-47040 B also discloses that, to improve the generation efficiency of sound reproduction signals, a configuration is employed in which yokes of magnet poles have an E shape with three legs and separate magnetic paths are simultaneously formed by allotting the magnetic flux to the magnetic poles with using the central magnetic pole in common in association with a swing motion of a magnet.

SUMMARY OF THE INVENTION

As disclosed in JP 61-31679 B and JP 61-47040 B, this type of moving-magnet type pickup cartridge employs a configuration in which a magnet is disposed in a vicinity of a supporting point of a base end part of a cantilever. Thus, the movement of the magnet is extremely small relative to the movement of a stylus chip provided at a front end part of the cantilever.

As a result, a change in magnetic flux density applied to a yoke is small compared to the motion of the stylus chip, and thus this type of moving-magnet type pickup cartridge has low generation efficiency of a sound signal. To make up for the low generation efficiency of a sound signal, JP 61-47040 B discloses a technique of devising the form of a yoke, but does not lead to a fundamental solution to improve the generating efficiency.

Further, according to the conventional moving-magnet type pickup cartridge, the amplitude due to a sound track received by the stylus chip is transferred to the magnet through an entire cantilever in a longitudinal direction as disclosed in JP 61-31679 B and JP 61-47040 B. This configuration causes delay of a signal, and also causes distortion of a sound signal due to mechanical bending of the cantilever.

Although hard aluminum, boron, artificial sapphire, or the like have been used as a raw material of a cantilever, a signal delay caused by transmission along the axial direction of the cantilever and distortion are hardly prevented.

The present invention has been made in view of the above technical problems in the conventional moving-magnet type pickup cartridges, and an objective of the invention is not only to ensure a large output signal but also to obtain a faithfully reproduced sound with little distortion.

In addition, another objective of the present invention is to provide a moving-magnet type stereo pickup cartridge capable of extracting a reproduced sound, for example from a 45-45 stereo phonograph record, while exhibiting the above advantageous effects.

According to a first aspect of the invention that has been made for solving the above problems, there is provided a moving-magnet type pickup cartridge, including: a cantilever; a stylus chip attached to a front end part in a longitudinal direction of the cantilever; a damper disposed at a base end part in the longitudinal direction of the cantilever and configured to support the cantilever in a swingable manner; a magnet disposed in the longitudinal direction of the cantilever and immediately above the stylus chip at the front end part of the cantilever, and configured to vibrate in response to vibration of the stylus chip; and a yoke formed in a U-shape, having generating coils being wound thereon, and having magnetic poles at both leg parts thereof being disposed to face the magnet.

According to a second aspect of the invention, there is provided a moving-magnet type pickup cartridge, including: a cantilever; a stylus chip attached to a front end part in a longitudinal direction of the cantilever; a damper disposed at a base end part in the longitudinal direction of the cantilever and configured to support the cantilever in a swingable manner; a magnet accommodated in the front end part of the cantilever immediately behind the stylus chip, and configured to vibrate with the vibration of the stylus chip; and a yoke formed in a U-shape, having generating coils being wound thereon, and having magnetic poles at both leg parts thereof being disposed to face the magnet accommodated in the cantilever.

In this configuration, according to a preferred embodiment, a pair of the yokes each of which is formed in a U-shape and has the generating coils wounded thereon are disposed on both right and left sides above the cantilever with the cantilever being centered between the yokes, and the magnetic poles of the both leg parts of each of the yokes are arranged to face each other in a direction of an axis of maximum sensitivity of the 45-45 system with respect to the magnet.

The magnet is desirably magnetized such that each of the N-pole and the S-pole thereof faces either of the magnetic poles of the both leg parts of the yoke.

The above said moving-magnet type pickup cartridge employs a configuration in which the magnet is disposed immediately above the stylus chip at the front end part of the cantilever or accommodated in the front end part of the cantilever immediately behind the stylus chip. With this configuration, the magnet is configured follows a sound groove to vibrate at almost the same amplitude as the stylus chip that of a phonograph record. Accordingly, large change in the magnetic flux density caused by large movement of the magnet is applied to the yoke of which magnetic poles of both leg parts face the magnet, and thus a moving-magnet type pickup cartridge having a high generating efficiency can be provided.

In addition, a moving-magnet type pickup cartridge is achieved which enables to obtain a faithful and little-distortion reproduction sound, because a vibration amplitude received by a stylus which follows a sound groove is transferred to the magnet without traveling over the longitudinal direction of the cantilever and, as a result, without delay of sound signals.

Furthermore, the moving-magnet type pickup cartridge is used to play a 45-45 stereo phonograph record. The moving-magnet type stereo pickup cartridge that enjoys the above described advantageous effects can be provided by employing a configuration in which the magnetic poles of the both leg parts of each of the yokes that are disposed above the cantilever with the cantilever being centered between the yokes are arranged to face each other in a direction of an axis of maximum sensitivity of the 45-45 system with respect to the magnet.

DESCRIPTION OF THE PREFERRED EMBODIMENTS

A moving-magnet type pickup cartridge according to the first embodiment of the invention will be described below with reference to FIGS. 1 to 4.

Figure 1:
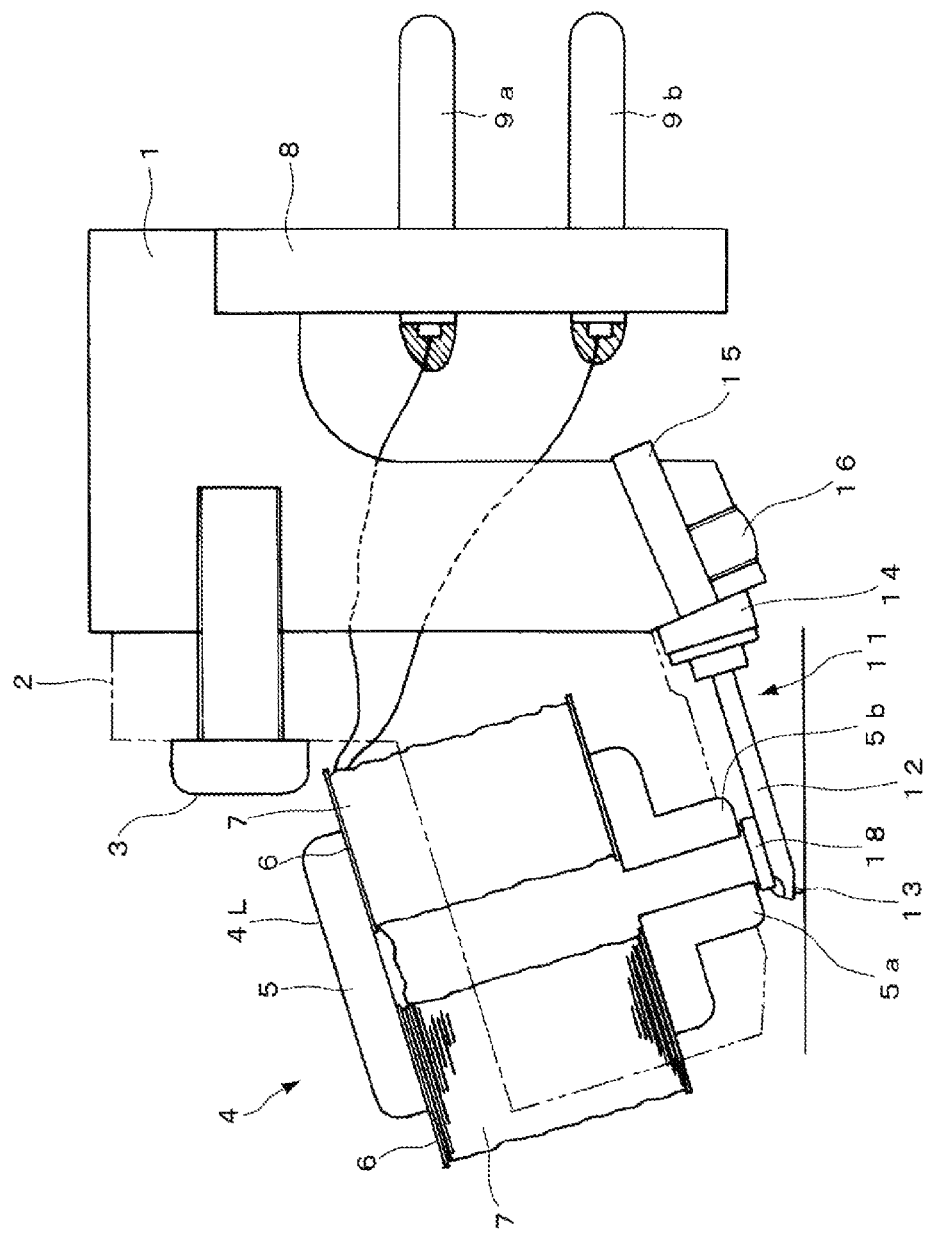
FIG. 1 is a transparent side view of a part of a moving-magnet type pickup cartridge according to the first embodiment of the present invention.

As shown in FIG. 1, the moving-magnet type pickup cartridge includes a holder 2 that is attached to the front side of a body 1 with a bolt 3 screwed into the body 1. The holder 2 is bent in an L-shape having a slightly obtuse angle.

A magnetic circuit 4 including yokes and the like is attached to the holder 2 in a slightly downward direction to correspond to an inclination angle of a front end surface of the holder 2.

Figure 2:
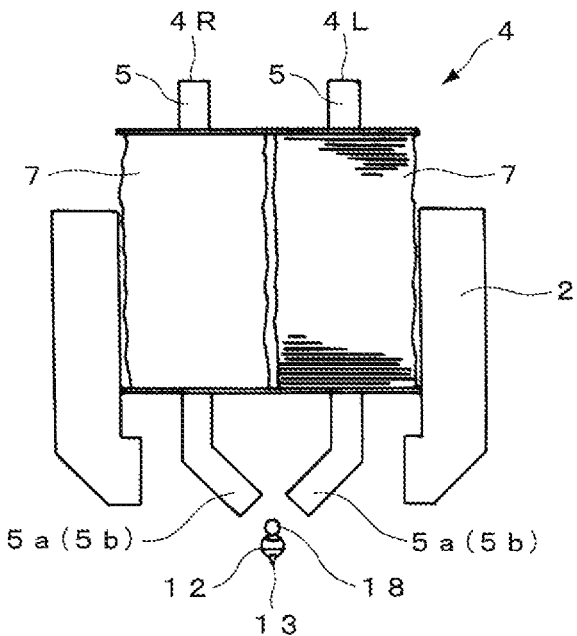
FIG. 2 is a front view of the pickup cartridge as viewed from the front end side of a cantilever in the axial direction.

As illustrated in FIG. 2, a pair of left-channel and right-channel magnetic circuits 4L and 4R are provided to reproduce signals from a 45-45 system stereo phonograph record. In the 45-45 system, the inner wall and the outer wall of a sound groove on a phonograph record have an inclination of 45 degrees each from the normal, and a left-channel sound and a right-channel sound are independently recorded, respectively.

Note that the left-channel and right-channel magnetic circuits 4L and 4R have the same configuration, and hereinafter the description will be given as to one of the magnetic circuits and a redundant description regarding the other component will be omitted.

FIG. 1 shows the left-channel magnetic circuit 4L including a yoke 5 formed in a U-shape. Tip ends of both leg parts of the yoke 5 face each other in parallel with a narrowed space between the tip ends, and form a pair of magnetic poles 5a and 5b. The pair of magnetic poles face a magnet provided on a cantilever that will be described later.

Both leg parts of the yoke 5 bent in a U-shape have generating coils 7 being wounded thereon to bobbins 6 respectively. The two generating coils 7 are connected in series to output a signal. An added signal from the generating coils 7 connected in series is output to terminal pins 9a and 9b implanted in a terminal plate 8 attached to the rear end of the body 1.

A vibration unit 11 including a cantilever, for example, is also attached to the body 1 by utilizing a thick portion at the lower end of the body 1. The vibration unit 11 includes a cantilever 12, a stylus chip 13 attached downward to a front end part in the longitudinal direction of the cantilever 12, a damper 14 that is provided at a base end part in the longitudinal direction of the cantilever 12 and supports the cantilever 12 in a swingable manner, and the like.

The cantilever 12 is pulled by wire (not illustrated) enclosed in a stopper pin 15 toward the damper 14 formed in a doughnut shape. The cantilever 12 is supported in a swingable manner with respect to the body 1 by using flexibility of the damper.

The stopper pin 15 is accommodated in a shaft hole formed on the body 1, and is supported by a bolt 16 that is screwed on the body 1 toward the shaft hole.

According to this embodiment, a bar-shaped magnet 18 is attached along the longitudinal direction of the cantilever 12 and immediately above the stylus chip 13 that is provided at the front end part of the cantilever 12.

Figure 4:
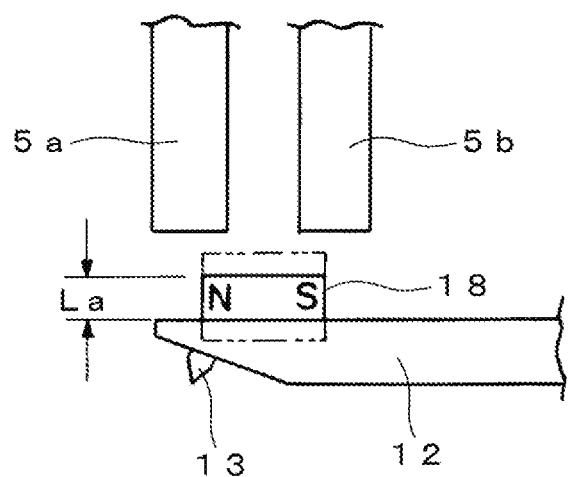
FIG. 4 is an exemplary diagram showing an arrangement state of the magnetic poles of the yoke and the magnet.

As shown in FIG. 4, the magnet 18 is magnetized such that one end in the axial direction is the N-pole, and the other end is the S-pole. Each of the magnetic poles 5a and 5b of the yoke 5 is disposed to face either end of the magnet 18 magnetized in the axial direction.

Figure 3:
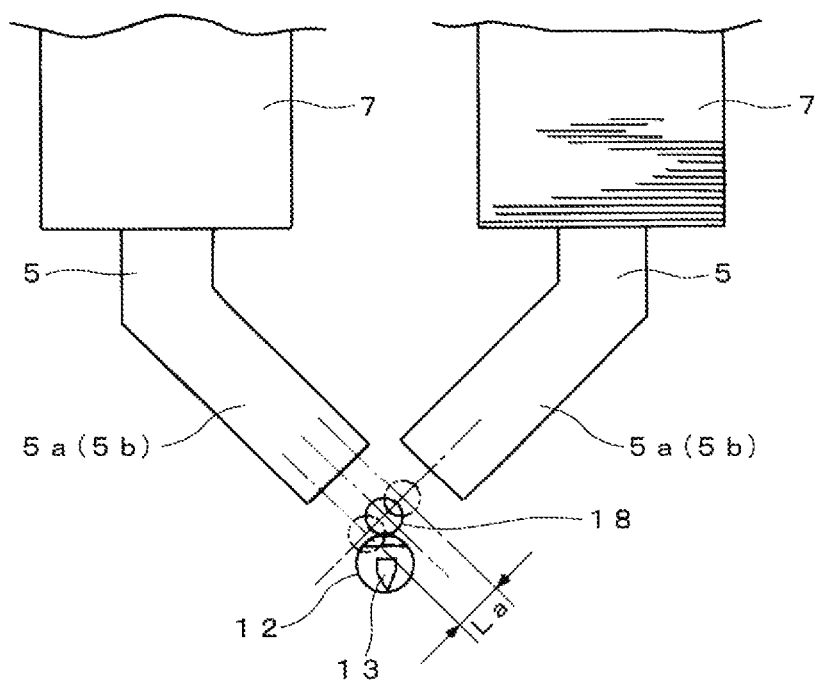
FIG. 3 is an exemplary diagram showing positional relationship of magnetic poles of right and left yokes and a magnet.

The pair of left and right yokes 5 are disposed above the cantilever 12 with the cantilever 12 being centered between the yokes as shown in FIG. 3. The magnetic poles 5a and 5b of both leg parts of each of the yokes 5 are disposed to face each other in the directions of the axes of maximum sensitivity of the 45-45 system with respect to the magnet 18.

FIG. 3 illustrates a state in which the magnet 18 is vibrated by the sound groove of the left-channel of the phonograph record. The amplitude La of motion of the magnet 18 causes to increase or to decrease the magnetic flux with respect to the yoke 5 of the left-channel (yoke on the right side in FIG. 3). This configuration allows to provide the terminal pins 9a and 9b of the left-channel with sound output depending on the change in the magnetic flux.

Note that the above-described vibration movement of the magnet 18 does not change the distance of the magnet from the magnetic pole with respect to the yoke 5 of the right-channel. Accordingly, the sound output is not generated at the terminal pins 9a and 9b of the right-channel, and thus the left and right channels can be sufficiently separated.

Figure 5:
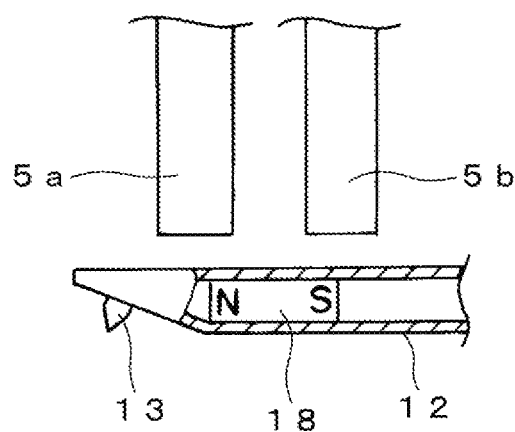
FIG. 5 is an exemplary diagram showing an arrangement state of magnetic poles of a yoke and a magnet according to the second embodiment of the present invention.

FIG. 5 shows a moving-magnet type pickup cartridge according to the second embodiment of the invention. In this embodiment, a bar-shaped magnet 18 is accommodated in the front end part of the cantilever 12 immediately behind the stylus chip 13.

The magnet 18 accommodated in the cantilever 12 is also magnetized in the axial direction, and each of the magnetic poles 5a and 5b of the yoke 5 faces either end of the magnet 18 magnetized in the axial direction.

Referring to FIG. 3 for example, the yokes 5 each of which includes the generating coils 7 forming the left or right channel can be disposed above the cantilever 12 that accommodates the magnet 18 in the cantilever 12 being centered between the yokes 5. With this configuration, a moving-magnet type stereo pickup cartridge can be provided like in the first embodiment.

According to either of the first and second embodiments, the magnet is configured to vibrate in a state in which the magnet is directly connected to the vibrating stylus chip that follows a sound groove of a phonograph record. This configuration enables to transfer a change in the magnetic flux density caused by a large vibration movement of the magnet to the yokes, and thus a moving-magnet type pickup cartridge having a high generation efficiency can be provided.

In addition, as the magnet vibrates in a state in which the magnet is directly connected to the vibrating stylus chip, it is possible to exhibit the advantageous effects as described in Summary of the Invention. For example, delay in a signal due to interposition of the cantilever and distortion due to bending of the cantilever can be suppressed.

What is claimed is:

1. A moving-magnet type pickup cartridge, comprising:
   a cantilever;
   a stylus chip attached to a front end part in a longitudinal direction of the cantilever;
   a damper disposed at a base end part in the longitudinal direction of the cantilever and configured to support the cantilever in a swingable manner;
   a magnet disposed in the longitudinal direction of the cantilever in a vicinity of the stylus chip at the front end part of the cantilever, and configured to vibrate in response to vibration of the stylus chip; and
   a yoke formed in a U-shape, having generating coils being wound thereon, and having magnetic poles at two leg parts thereof being disposed to face the magnet,
   wherein the magnet is disposed in the longitudinal direction of the cantilever and immediately above the stylus chip at the front end part of the cantilever.

2. The moving-magnet type pickup cartridge according to claim 1,
   wherein the moving-magnet type pickup cartridge is used to play a 45-45 stereo phonograph record,
   wherein the yoke includes a pair of yoke members each of which is formed in the U-shape and has the generating coils wounded thereon, the pair of yoke members being disposed on right and left sides above the cantilever being centered between the pair of yoke members,
   wherein the magnetic poles of the leg parts of each of the pair of yoke members are arranged to face each other in a direction of an axis of maximum sensitivity of the 45-45 system with respect to the magnet.

3. The moving-magnet type pickup cartridge according to claim 1,
   wherein the magnet is magnetized such that an N-pole and an S-pole thereof face the magnetic poles of the leg parts of the yoke, respectively.

4. A moving-magnet type pickup cartridge, comprising:
   a cantilever;
   a stylus chip attached to a front end part in a longitudinal direction of the cantilever;
   a damper disposed at a base end part in the longitudinal direction of the cantilever and configured to support the cantilever in a swingable manner;
   a magnet disposed in the longitudinal direction of the cantilever in a vicinity of the stylus chip at the front end part of the cantilever, and configured to vibrate in response to vibration of the stylus chip; and
   a yoke formed in a U-shape, having generating coils being wound thereon, and having magnetic poles at two leg parts thereof being disposed to face the magnet,
   wherein the magnet is accommodated in the front end part of the cantilever immediately behind the stylus chip.

5. The moving-magnet type pickup cartridge according to claim 4, wherein the moving-magnet type pickup cartridge is used to play a 45-45 stereo phonograph record,
   wherein the yoke includes a pair of yoke members each of which is formed in the U-shape and has the generating coils wounded thereon, the pair of yoke members being disposed on right and left sides above the cantilever being centered between the pair of yoke members,
   wherein the magnetic poles of the leg parts of each of the pair of yoke members are arranged to face each other in a direction of an axis of maximum sensitivity of the 45-45 system with respect to the magnet.

6. The moving-magnet type pickup cartridge according to claim 4, wherein the magnet is magnetized such that an N-pole and an S-pole thereof face the magnetic poles of the leg parts of the yoke, respectively.

* * * * *